United States Patent
Hsieh et al.

(10) Patent No.: US 10,372,011 B2
(45) Date of Patent: Aug. 6, 2019

(54) ELECTRONICALLY CONTROLLED LIGHT VALVE AND DISPLAY APPARATUS HAVING HIGH TRANSMITTANCE AND HIGH REFLECTIVITY

(71) Applicant: Chunghwa Picture Tubes, LTD., Taoyuan (TW)

(72) Inventors: Wen-Jiunn Hsieh, New Taipei (TW); Cheng-Min Liao, Taoyuan (TW); Wen-Tse Tseng, Taoyuan (TW)

(73) Assignee: Chunghwa Picture Tubes, LTD., Taoyuan (TW)

(*) Notice: Subject to any disclaimer, the term of this patent is extended or adjusted under 35 U.S.C. 154(b) by 0 days.

(21) Appl. No.: 15/933,385

(22) Filed: Mar. 23, 2018

(65) Prior Publication Data
US 2019/0208159 A1 Jul. 4, 2019

(30) Foreign Application Priority Data
Dec. 29, 2017 (CN) .......................... 2017 1 1469695

(51) Int. Cl.
*G02F 1/17* (2019.01)
*H04N 5/74* (2006.01)
(Continued)

(52) U.S. Cl.
CPC ............ *G02F 1/172* (2013.01); *F21V 14/003* (2013.01); *G02B 26/004* (2013.01);
(Continued)

(58) Field of Classification Search
CPC ............ G02F 1/133348; G02F 1/1334; G02F 2001/13347; G02F 1/133553;
(Continued)

(56) References Cited

U.S. PATENT DOCUMENTS 7,417,699 B2 8/2008 Yun et al.
7,538,934 B2 * 5/2009 Van Bommel ......... B82Y 30/00
359/245
(Continued)

FOREIGN PATENT DOCUMENTS

CN 1234878 11/1999
CN 1236445 11/1999
(Continued)

OTHER PUBLICATIONS

Wang et al., "A New Technology of Mirror LCD," SID Symposium Digest of Technical Papers, Jun. 2, 2017, p. 1160-1162.

*Primary Examiner* — Bao-Luan Q Le
(74) *Attorney, Agent, or Firm* — JCIPRNET

(57) ABSTRACT

Provided are a display apparatus and an electrically controlled light valve including a first substrate, a second substrate disposed opposite to the first substrate, a first transparent conductive layer disposed on the first substrate, a second transparent conductive layer disposed on the second substrate, a first liquid layer disposed between the first and the second transparent conductive layers, a second liquid layer disposed between the first and the second transparent conductive layers and reflective particles. The first and the second liquid layers are respectively adjacent to the first and the second transparent conductive layers. The first liquid layer includes a polar liquid. The second liquid layer includes a non-polar liquid. Each reflective particle has a conductive body and a surface modification layer covering the conductive body. When the electrically controlled light valve is switched to a light-transmission mode, the reflective particles are evenly dispersed in the first liquid layer.

12 Claims, 4 Drawing Sheets

(51) Int. Cl.
    *F21V 14/00*     (2018.01)
    *G02F 1/1335*     (2006.01)
    *G02B 26/00*     (2006.01)
    *G02B 26/08*     (2006.01)
    *G02F 1/1334*     (2006.01)
    *G02F 1/1333*     (2006.01)
    *G02F 1/19*     (2019.01)
    *G02F 1/1347*     (2006.01)
    *G02F 1/135*     (2006.01)

(52) U.S. Cl.
    CPC ....... *G02B 26/005* (2013.01); *G02B 26/0816* (2013.01); *G02F 1/1334* (2013.01); *G02F 1/133348* (2013.01); *G02F 1/133536* (2013.01); *G02F 1/133553* (2013.01); *G02F 1/133555* (2013.01); *H04N 5/7441* (2013.01); *G02F 1/19* (2013.01); *G02F 2001/1352* (2013.01); *G02F 2001/13478* (2013.01); *G02F 2001/133562* (2013.01)

(58) Field of Classification Search
    CPC ..... G02F 1/133555; G02F 2001/13478; G02F 2001/1352; G02F 1/172; G02F 1/19; B82Y 30/00; G02B 26/004; G02B 26/005
    See application file for complete search history.

(56) References Cited

U.S. PATENT DOCUMENTS

| | | | | |
|---|---|---|---|---|
| 7,636,187 | B2 * | 12/2009 | Morozumi | G02B 26/004 359/228 |
| 8,711,322 | B2 * | 4/2014 | Cheng | G02B 26/004 345/690 |
| 8,995,046 | B2 * | 3/2015 | Mori | G02F 1/167 204/450 |
| 9,291,855 | B2 * | 3/2016 | Satoh | G02F 1/1337 |
| 9,507,189 | B2 * | 11/2016 | Satoh | G02F 1/19 |
| 2003/0227695 | A1 | 12/2003 | Borra et al. | |
| 2008/0037105 | A1 * | 2/2008 | Van Bommel | B82Y 30/00 359/296 |
| 2008/0106689 | A1 * | 5/2008 | Inoue | C09K 19/22 349/181 |
| 2008/0174846 | A1 * | 7/2008 | Morozumi | G02B 26/004 359/228 |
| 2009/0103159 | A1 * | 4/2009 | Cheng | G02B 26/005 359/228 |
| 2013/0201549 | A1 * | 8/2013 | Mori | G02F 1/167 359/296 |
| 2015/0077835 | A1 * | 3/2015 | Yamazaki | G02F 1/167 359/296 |
| 2015/0146131 | A1 * | 5/2015 | Satoh | G02F 1/1337 349/61 |
| 2015/0219946 | A1 * | 8/2015 | Satoh | G02F 1/19 349/33 |

FOREIGN PATENT DOCUMENTS

| | | |
|---|---|---|
| CN | 103176658 | 6/2013 |
| CN | 105807526 | 7/2016 |
| TW | 475526 U | 2/2002 |
| TW | 200403494 | 3/2004 |
| TW | 200602733 | 1/2006 |
| TW | 201535020 | 9/2015 |

* cited by examiner

ELECTRONICALLY CONTROLLED LIGHT VALVE AND DISPLAY APPARATUS HAVING HIGH TRANSMITTANCE AND HIGH REFLECTIVITY

CROSS-REFERENCE TO RELATED APPLICATION

This application claims the priority benefit of China application serial no. 201711469695.8, filed on Dec. 29, 2017. The entirety of the above-mentioned patent application is hereby incorporated by reference herein and made a part of this specification.

BACKGROUND

Field of the Invention

The invention relates to an electrically controlled light valve and a display apparatus and more particularly, to an electrically controlled light valve and a display apparatus capable of being switched to a reflection mode.

Description of Related Art

A mirror display apparatus is an apparatus provided with both a display and a mirror functions. The mirror display apparatus used in a car rear-view mirror is one of the most common applications and even may be applied to dressing mirrors used by the apparel industry. Because the mirror display apparatus has to be provided with both the display and the mirror functions, its structure requires features capable of allowing the light to pass through and to be reflected. For example, a reflective polarizer may be adhered to a light-emitting surface of a liquid crystal display (LCD) panel, or a metal reflection layer may be disposed in a part of a pixel region of the LCD panel.

However, when the mirror display apparatus using the aforementioned structure is operated in a display mode, the mirror reflection function still exists, such that a reflected image and a displayed image may overlap, which results in unclearness of the displayed information. To solve the aforementioned issue, a liquid crystal light valve may be disposed on the light-emitting side of the LCD panel, and a reflective polarizer and a transmissive polarizer may be respectively adhered to a light-entering side and a light-emitting side of the liquid crystal light valve. When the mirror display apparatus is operated in the display mode, the liquid crystal light valve is capable of effectively blocking the reflection of external ambient light beams, thereby improving the issue that the reflected image and the displayed image overlap. However, because the liquid crystal light valve is adhered with the polarizers, the disposition of the polarizers may cause energy loss to the display light beams from the LCD panel, such that issues, such as low transmittance and high power consumption, may occur to the mirror display apparatus.

SUMMARY

The invention is directed to an electrically controlled light valve having a high transmittance when being in a light-transmission mode and having a high reflectivity when being in a reflection mode.

The invention is directed to a display apparatus including an electrically controlled light valve, wherein the electrically controlled light valve has a high transmittance when the display apparatus is in a display mode and has a high reflectivity when the display apparatus is in a reflection mode.

According to an embodiment of the invention, an electrically controlled light valve including a first substrate, a second substrate, a first transparent conductive layer, a second transparent conductive layer, a first liquid layer, a second liquid layer and a plurality of reflective particles is provided. The first transparent conductive layer is disposed on the first substrate. The second transparent conductive layer is disposed on the second substrate. The first liquid layer is disposed between the first transparent conductive layer and the second transparent conductive layer and adjacent to the first transparent conductive layer, wherein the first liquid layer includes a polar liquid. The second liquid layer is disposed between the first transparent conductive layer and the second transparent conductive layer and adjacent to the second transparent conductive layer, wherein the first liquid layer includes a non-polar liquid. Each of the reflective particles has a conductive body and a surface modification layer covering the conductive body. When the electrically controlled light valve is switched to a light-transmission mode, the reflective particles are evenly dispersed in the first liquid layer. When the electrically controlled light valve is switched to a reflection mode, the reflective particles are accumulated on an interface between the first liquid layer and the second liquid layer.

According to an embodiment of the invention, a display apparatus including a display panel and an electrically controlled light valve is provided. The display panel is adapted to emit a display light beam. The electrically controlled light valve is disposed on a transmission path of the display light beam.

In the electrically controlled light valve according to an embodiment of the invention, the first liquid layer includes water.

In the electrically controlled light valve according to an embodiment of the invention, the first liquid layer further includes sodium chloride (NaCl) mixed in the water.

In the electrically controlled light valve according to an embodiment of the invention, the second liquid layer includes 1,2-dichloroethane.

In the electrically controlled light valve according to an embodiment of the invention, the second liquid layer further includes tetrabutylammonium tetraphenylborate (TBATPB) mixed in the 1,2-dichloroethane.

In the electrically controlled light valve according to an embodiment of the invention, the conductive body include gold, silver, platinum or an alloy containing gold, silver or platinum.

In the electrically controlled light valve according to an embodiment of the invention, the surface modification layer includes a 12-mercaptododecanoic acid.

In the electrically controlled light valve according to an embodiment of the invention, a concentration of each of the reflective particles in the first liquid layer ranges from 1012 particles/cm$^3$ to 1014 particles/cm$^3$, and a diameter of each of the reflective particles ranges from 5 nm to 100 nm.

In the electrically controlled light valve according to the embodiments of the invention, by controlling a potential difference between the first transparent conductive layer and the second transparent conductive layer, the reflective particles are capable of being evenly dispersed in the first liquid layer, such that the electrically controlled light valve has a high transmittance, or alternatively, the reflective particles are capable of being accumulated on the interface between the first liquid layer and the second liquid layer, such that the electrically controlled light valve has a high reflectivity.

In the display apparatus of the embodiments of the invention, the display apparatus includes the electrically controlled light valve. In the display mode, the electrically controlled light valve of the display apparatus has the high transmittance, and thus, the display apparatus has low power consumption. In the reflection mode, the electrically controlled light valve of the display apparatus has the high reflectivity, and thus, the display apparatus has a high reflectivity.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
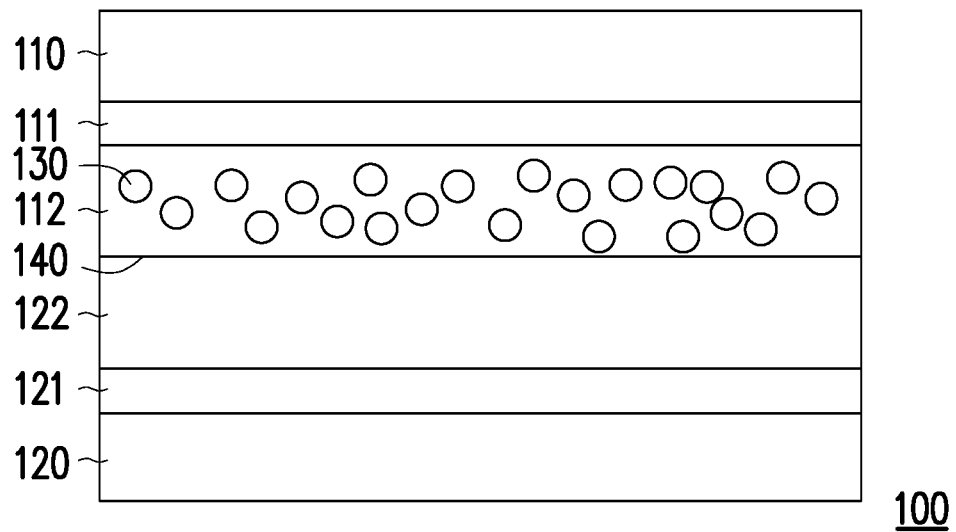
FIG. 1 is a schematic cross-sectional view illustrating an electrically controlled light valve according to an embodiment of the invention.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a schematic cross-sectional view illustrating an electrically controlled light valve according to an embodiment of the invention. An electrically controlled light valve 100 includes a first substrate 110, a second substrate 120, a first transparent conductive layer 111, a second transparent conductive layer 121, a first liquid layer 112, a second liquid layer 122 and a plurality of reflective particles 130. The second substrate 120 is disposed opposite to the first substrate 110. The first transparent conductive layer 111 is disposed on a side of the first substrate 110 which is opposite to the second substrate 120. The second transparent conductive layer 121 is disposed on a side of the second substrate 120 which is opposite to the first substrate 110. The first liquid layer 112 is disposed between the first transparent conductive layer 111 and the second transparent conductive layer 121 and adjacent to the first transparent conductive layer 111. The second liquid layer 122 is disposed between the first transparent conductive layer 111 and the second transparent conductive layer 121 and adjacent to the second transparent conductive layer 121. The first liquid layer 112 includes a polar liquid. The second liquid layer 122 includes a non-polar liquid.

For example, in the present embodiment, the first liquid layer 112 includes water, and the second liquid layer 122 includes 1,2-dichloroethane, wherein the water is a polar liquid, the 1,2-dichloroethane is a non-polar liquid, and the first liquid layer 111 and the second liquid layer 122 are not dissolved with each other and thus, exist in an interface 140. Furthermore, in the present embodiment, the first liquid layer 112 further includes a salt, e.g., sodium chloride (NaCl) of which a preferable addition concentration is 10 mM, but the invention is not limited thereto. An effect of adding the salt in the polar liquid lies in that the reflective particles 130 may be more evenly dispersed in the first liquid layer 112. In the present embodiment, the second liquid layer 122 further includes a salt, e.g., tetrabutylammonium tetraphenylborate (TBATPB) mixed in the 1,2-dichloroethane of which a preferable addition concentration is 10 mM, but the invention is not limited thereto.

Figure 2:
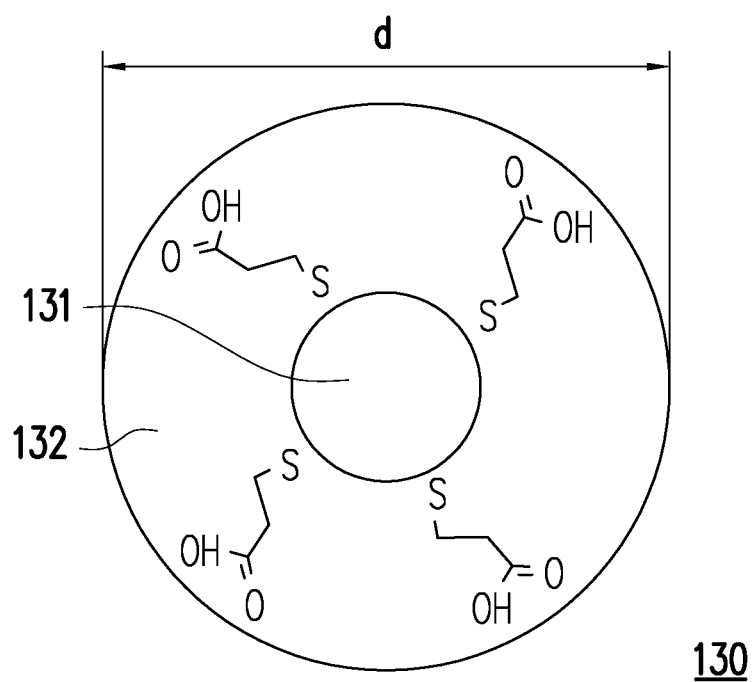
FIG. 2 is a schematic cross-sectional view illustrating a reflective particle according to an embodiment of the invention.

FIG. 2 is a schematic cross-sectional view illustrating a reflective particle according to an embodiment of the invention. Referring to FIG. 2, each of the reflective particles 130 has a conductive body 131 and a surface modification layer 132 covering the conductive body 131. For example, in the present embodiment, the conductive body 131 of each of the reflective particles 130 may include gold, and the surface modification layer 132 may include a 12-mercaptododecanoic acid. The surface modification layer 132 has carboxyl, such that the reflective particles 130 may have polarity and be evenly dispersed in the first liquid layer 112.

Figure 3:
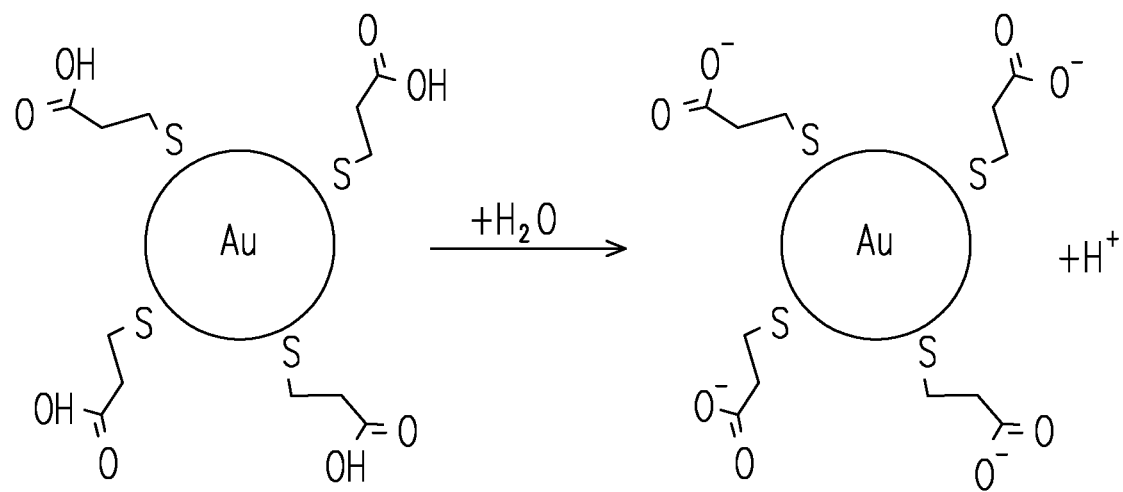
FIG. 3 illustrates a chemical reaction formula of carboxyl and water according to an embodiment of the invention.

FIG. 3 illustrates a chemical reaction formula of carboxyl and water according to an embodiment of the invention. Referring to FIG. 3, a dissociation reaction may occur easily to the carboxyl when encountering water molecules, thereby inducing the reflective particles 130 to carry negative charges. In an preferred embodiment, an addition concentration of the reflective particles 130 in the first liquid layer 112 ranges from 1012 particles/$cm^3$ to 1014 particles/$cm^3$ (for example, 17.1×1012 particles/$cm^3$), and a diameter d (which is illustrated in FIG. 2) of the reflective particles ranges from 5 nm to 100 nm (for example, 16 nm). In another embodiment, the conductive body 131 of each of the reflective particles 130 may include another conductive material, for example, silver, platinum or an alloy containing the aforementioned metal elements.

Figure 4:
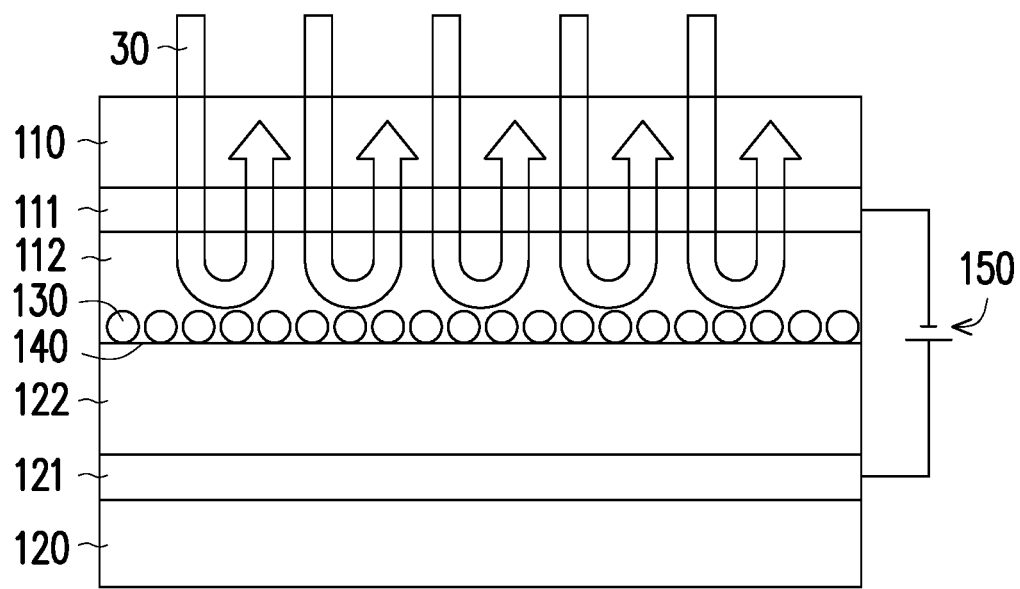
FIG. 4 illustrates the electrically controlled light valve being switched to a reflection mode according to an embodiment of the invention.

FIG. 4 illustrates the electrically controlled light valve being switched to a reflection mode according to an embodiment of the invention. Referring to FIG. 4, for example, in the present embodiment, when the first transparent conductive layer 111 and the second transparent conductive layer 121 of the electrically controlled light valve 100 are respectively electrically connected to two ends of a power source 150, and a potential difference between the first transparent conductive layer 111 and the second transparent conductive layer 121 is set to a negative value (i.e., the first transparent conductive layer 111 has a negative polarity, and the second transparent conductive layer 121 has a positive polarity), the reflective particles 130 carrying the negative charges, due to being influenced by an electrostatic coulomb force from the first transparent conductive layer 111 which also has the negative polarity, depart away from the first transparent conductive layer 111, so as to be accumulated on the interface 140 between the first liquid layer 111 and the second liquid layer 122, thereby forming a reflective layer. In this circumstance, a light beam 30 entering from a side of the electrically controlled light valve 100 and passing through the first substrate 110, the first transparent conductive layer 111 and the first liquid layer 112 are reflected by the reflective particles 130 on the reflective layer formed by the interface 140, such that the electrically controlled light valve 100 is operated in a reflection mode (or referred to as a mirror mode).

Figure 5:
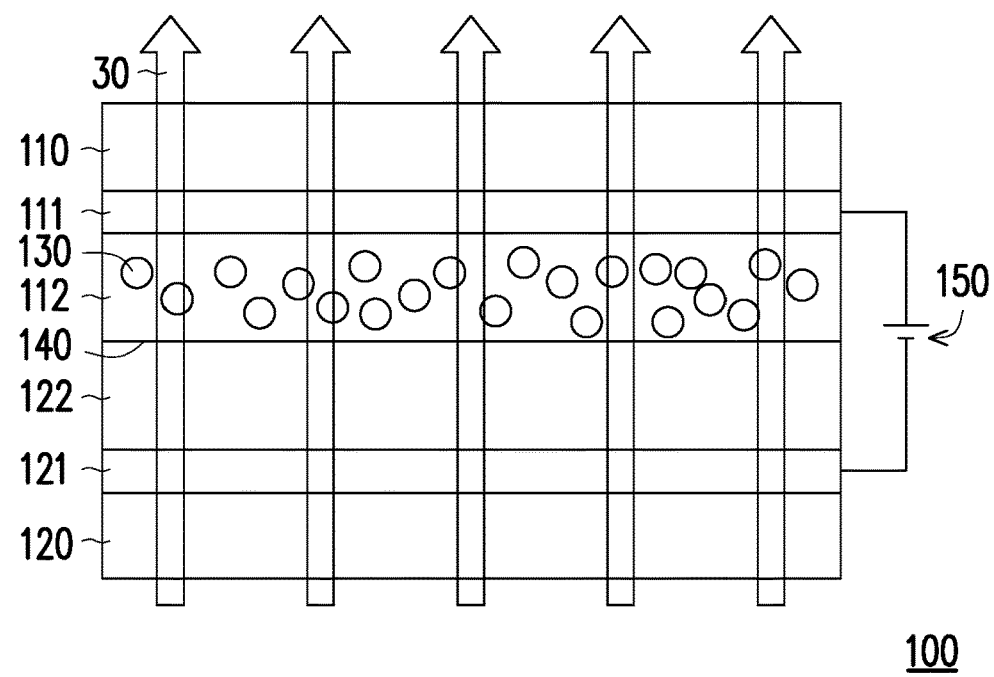
FIG. 5 illustrates the electrically controlled light valve being switched to a light-transmission mode according to an embodiment of the invention.

FIG. 5 illustrates the electrically controlled light valve being switched to a light-transmission mode according to an embodiment of the invention. Referring to FIG. 5, when the first transparent conductive layer 111 and the second transparent conductive layer 121 of the electrically controlled light valve 100 are respectively electrically connected to the two ends of the power source 150, and the potential difference between the first transparent conductive layer 111 and the second transparent conductive layer 121 is set to a positive value (i.e., the first transparent conductive layer 111 has a positive polarity, and the second transparent conductive layer 121 has a negative polarity), the reflective particles 130 are evenly dispersed in the first liquid layer 112. In this circumstance, the light beam 30 entering from a side of the electrically controlled light valve 100 is capable of passing through the overall electrically controlled light valve 100, such that the electrically controlled light valve 100 is operated in a light-transmission mode.

It should be noted that the potential difference between the first transparent conductive layer 111 and the second transparent conductive layer 121 when the electrically controlled light valve 100 is operated in the reflection mode or the light-transmission mode is provided as an example for describing the invention and is not used for limiting the invention, and according to the difference in actual applications, the potential difference between the first transparent conductive layer 111 and the second transparent conductive layer 121 which induces the electrically controlled light valve 100 to operate in the reflection mode or the light-transmission mode may be other suitable values.

Figure 6:
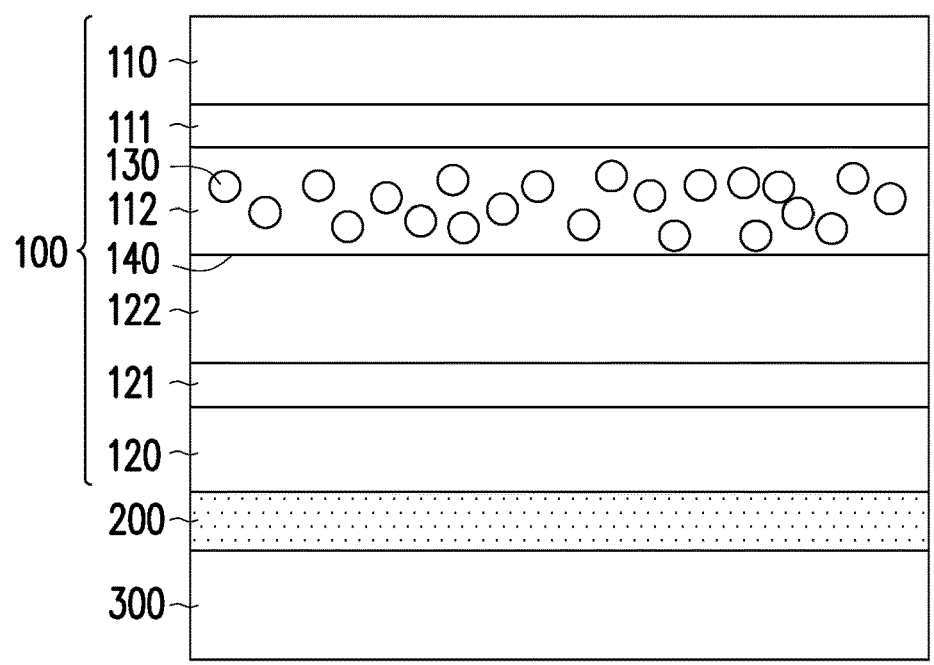
FIG. 6 is a schematic cross-sectional view illustrating a display apparatus according to an embodiment of the invention.
Figure 8:
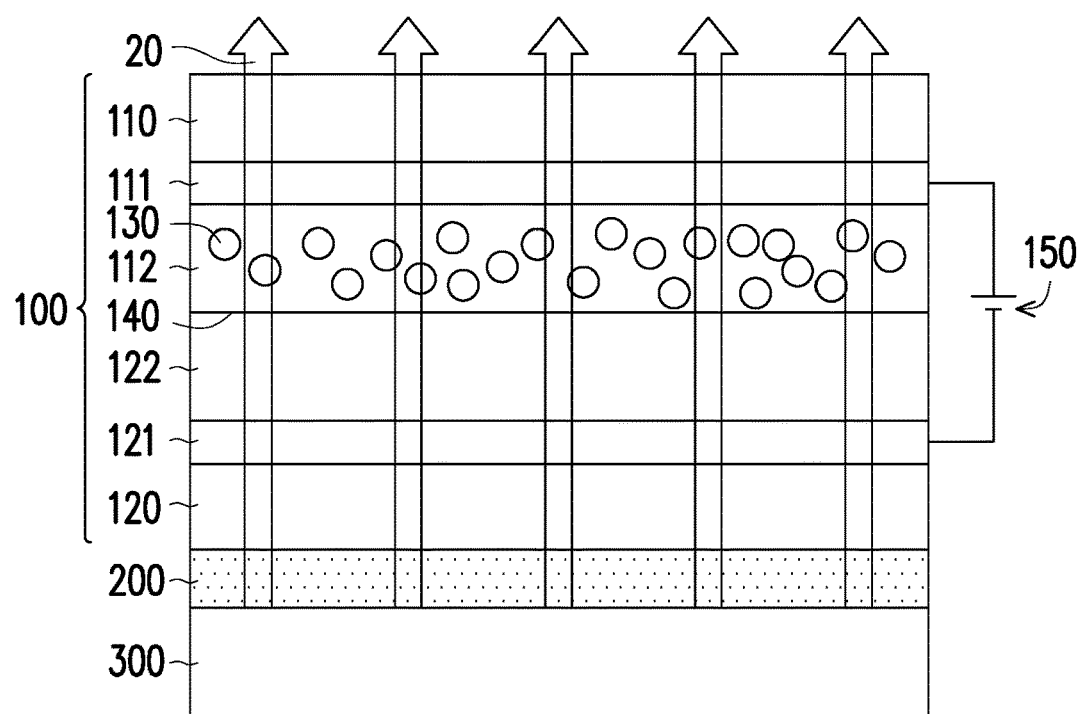
FIG. 8 illustrates the display apparatus being switched to a display mode according to an embodiment of the invention.

FIG. 6 is a schematic cross-sectional view illustrating a display apparatus according to an embodiment of the invention. Referring to FIG. 6, a display apparatus 1000 includes the aforementioned electrically controlled light valve 100 and a display panel 300. The display panel 300 is adapted to emit a display light beam 20 (which is illustrated in FIG. 8), and the electrically controlled light valve 100 is disposed on a transmission path of the display light beam 20. For example, in the present embodiment, the electrically controlled light valve 100 may be connected to the display panel 300 by a connection layer 200. The connection layer 200 is, for example, a transparent optical adhesive layer, but the invention is not limited thereto. In the present embodiment, the connection layer 200 may selectively entirely cover the display panel 300, while the connection layer 200 may be an overall transparent optical adhesive layer, but the invention is not limited thereto. In other embodiments, the connection layer 200 may not entirely cover the display panel 300, and the connection layer 200 may be a patterned transparent optical adhesive layer, for example, a square-shaped adhesive layer.

In the present embodiment, the display panel 300 is, for example, a liquid crystal display (LCD) panel, but the invention is not limited thereto. In other embodiments, the display panel 300 may also be an organic light-emitting diode (OLED) display panel, a field-emission display panel, a micro light-emitting diode (LED) display panel, or any other suitable display panel.

Figure 7:
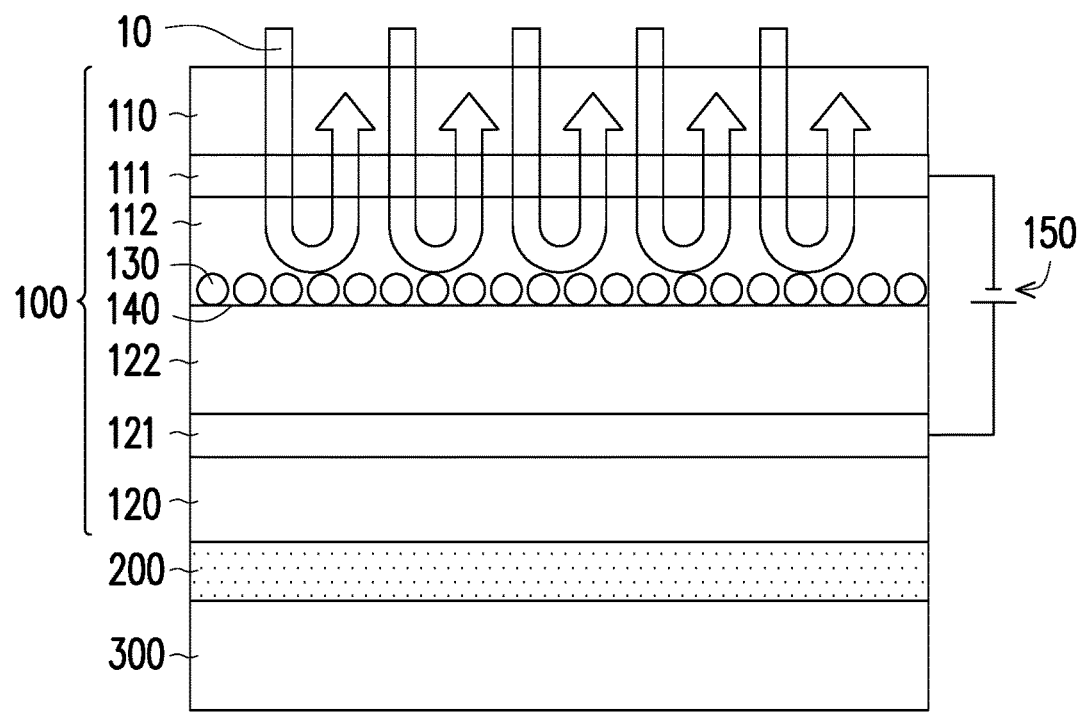
FIG. 7 illustrates the display apparatus being switched to a reflection mode according to an embodiment of the invention.

FIG. 7 illustrates the display apparatus being switched to a reflection mode according to an embodiment of the invention. Referring to FIG. 7, for example, in the present embodiment, when the first transparent conductive layer 111 and the second transparent conductive layer 121 of the electrically controlled light valve 100 are respectively electrically connected to the two ends of the power source 150, and the potential difference between the first transparent conductive layer 111 and the second transparent conductive layer 121 is set to a negative value (i.e., the first transparent conductive layer 111 has a negative polarity, and the second transparent conductive layer 121 has a positive polarity), the reflective particles 130 carrying the negative charges, due to being influenced by the electrostatic coulomb force from the first transparent conductive layer 111 which also has the negative polarity, depart away from the first transparent conductive layer 111, so as to be accumulated on the interface 140 between the first liquid layer 111 and the second liquid layer 122, thereby forming the reflective layer. In this circumstance, an ambient light beam 10 entering from a side of the display apparatus 1000 and passing through the first substrate 110, the first transparent conductive layer 111 and the first liquid layer 112 are reflected by the reflective particles 130 on the reflective layer formed by the interface 140, such that the display apparatus 1000 is operated in a reflection mode (or referred to as a mirror mode).

FIG. 8 illustrates the display apparatus being switched to a display mode according to an embodiment of the invention. Referring to FIG. 8, for example, in the present embodiment, when the first transparent conductive layer 111 and the second transparent conductive layer 121 of the electrically controlled light valve 100 are respectively electrically connected to the two ends of the power source 150, and the potential difference between the first transparent conductive layer 111 and the second transparent conductive layer 121 is set to a positive value (i.e., the first transparent conductive layer 111 has a positive polarity, and the second transparent conductive layer 121 has a negative polarity), the reflective particles 130 are evenly dispersed in the first liquid layer 112. In this circumstance, the display light beam 20 entering from the display panel 200 is capable of passing through the overall electrically controlled light valve 100, such that the display apparatus 1000 is operated in a display mode.

In light of the foregoing, the electrically controlled light valve of the embodiments of the invention includes the first substrate, the second substrate, the first transparent conductive layer, the second transparent conductive layer, the first liquid layer, the second liquid layer and the reflective particles. The first transparent conductive layer is disposed on the side of the first substrate which is opposite to the second substrate. The second transparent conductive layer is disposed on the side of the second substrate which is opposite to the first substrate. The first liquid layer is disposed between the first transparent conductive layer and the second transparent conductive layer and adjacent to the first transparent conductive layer. The second liquid layer is disposed between the first transparent conductive layer and the second transparent conductive layer and adjacent to the second transparent conductive layer. By controlling the potential difference between the first transparent conductive layer and the second transparent conductive layer, the reflective particles can be evenly dispersed in the first liquid layer, such that the electrically controlled light valve has the high transmittance, or alternatively, the reflective particles can be accumulated on the interface between the first liquid layer and the second liquid layer to form the reflective layer, such that the electrically controlled light valve has the high reflectivity.

The display apparatus of the embodiments of the invention uses the electrically controlled light valve having the high transmittance or the high reflectivity for the display light beam to pass through, or for the ambient light beam to be reflected. In the display mode, the electrically controlled light valve of the display apparatus has the high transmittance, and thus, the display apparatus has low power consumption. In the reflection mode, the electrically controlled light valve of the display apparatus has the high reflectivity, and thus, the display apparatus has the high reflectivity.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electrically controlled light valve, adapted to be switched to a reflection mode or a light-transmission mode, comprising:
   a first substrate;
   a second substrate, disposed opposite to the first substrate;
   a first transparent conductive layer, disposed on the first substrate;
   a second transparent conductive layer, disposed on the second substrate;
   a first liquid layer, disposed between the first transparent conductive layer and the second transparent conductive layer and adjacent to the first transparent conductive layer, wherein the first liquid layer comprises a polar liquid, water, and sodium chloride (NaCl) mixed in the water;
   a second liquid layer, disposed between the first transparent conductive layer and the second transparent conductive layer and adjacent to the second transparent conductive layer, wherein the second liquid layer comprises a non-polar liquid; and
   a plurality of reflective particles, each of the reflective particles having a conductive body and a surface modification layer, wherein the surface modification layer has a uniform property throughout the surface modification layer and the conductive body is at least partially surrounded by the surface modification layer,
   wherein when the electrically controlled light valve is switched to the light-transmission mode, the reflective particles are evenly dispersed in the first liquid layer, and
   when the electrically controlled light valve is switched to the reflection mode, the reflective particles are accumulated on an interface between the first liquid layer and the second liquid layer.

2. The electrically controlled light valve according to claim 1, wherein the second liquid layer comprises 1,2-dichloroethane.

3. The electrically controlled light valve according to claim 2, wherein the second liquid layer further comprises: tetrabutylammonium tetraphenylborate (TBATPB), mixed in the 1,2-dichloroethane.

4. The electrically controlled light valve according to claim 1, wherein the conductive body comprises gold, silver, platinum or an alloy containing gold, silver or platinum.

5. The electrically controlled light valve according to claim 1, wherein the surface modification layer comprises a 12-mercaptododecanoic acid.

6. The electrically controlled light valve according to claim 1, wherein a concentration of each of the reflective particles in the first liquid layer ranges from 1012 particles/cm3 to 1014 particles/cm3, and a diameter of each of the reflective particles ranges from 5 nm to 100 nm.

7. A display apparatus, comprising:
   a display panel, adapted to emit a display light beam; and
   an electrically controlled light valve, disposed on a transmission path of the display light beam, adapted to be switched to a reflection mode or a light-transmission mode and comprising:
   a first substrate;
   a second substrate, disposed opposite to the first substrate;
   a first transparent conductive layer, disposed on the first substrate;
   a second transparent conductive layer, disposed on the second substrate;
   a first liquid layer, disposed between the first transparent conductive layer and the second transparent conductive layer and adjacent to the first transparent conductive layer, wherein the first liquid layer comprises a polar liquid, water, and sodium chloride (NaCl) mixed in the water;
   a second liquid layer, disposed between the first transparent conductive layer and the second transparent conductive layer and adjacent to the second transparent conductive layer, wherein the second liquid layer comprises a non-polar liquid; and
   a plurality of reflective particles, each of the reflective particles having a conductive body and a surface modification layer, wherein the surface modification layer has a uniform property throughout the surface modification layer and the conductive body is at least partially surrounded by the surface modification layer,
   wherein when the electrically controlled light valve is switched to the light-transmission mode, the reflective particles are evenly dispersed in the first liquid layer, and
   when the electrically controlled light valve is switched to the reflection mode, the reflective particles are accumulated on an interface between the first liquid layer and the second liquid layer.

8. The display apparatus according to claim 7, wherein the second liquid layer comprises 1,2-dichloroethane.

9. The display apparatus according to claim 8, wherein the second liquid layer further comprises:
   tetrabutylammonium tetraphenylborate (TBATPB), mixed in the 1,2-dichloroethane.

10. The display apparatus according to claim 7, wherein the conductive body comprises gold, silver, platinum or an alloy containing gold, silver or platinum.

11. The display apparatus according to claim 7, wherein the surface modification layer comprises a 12-mercaptododecanoic acid.

12. The display apparatus according to claim 7, wherein a concentration of each of the reflective particles in the first liquid layer ranges from 1012 particles/cm3 to 1014 particles/cm3, and a diameter of each of the reflective particles ranges from 5 nm to 100 nm.

* * * * *